No. 896,474. PATENTED AUG. 18, 1908.
T. W. SMALL.
STREET INDICATING DEVICE.
APPLICATION FILED FEB. 1, 1907.

4 SHEETS—SHEET 1.

WITNESSES:
Brennan B. West
Nathan F. Fretten

INVENTOR,
Thomas W. Small.
BY Bates, Fouts & Hull,
ATTYS.

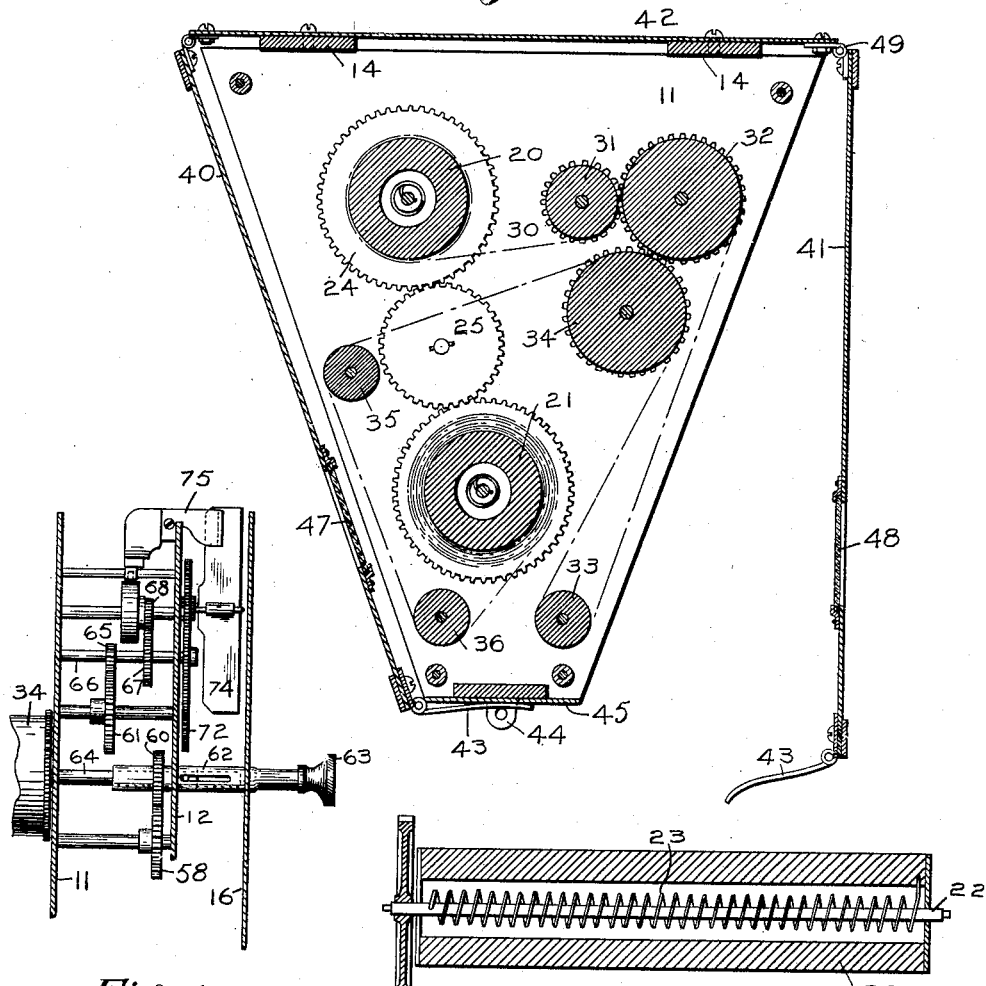

No. 896,474. PATENTED AUG. 18, 1908.
T. W. SMALL.
STREET INDICATING DEVICE.
APPLICATION FILED FEB. 1, 1907.

4 SHEETS—SHEET 3.

WITNESSES:
Brennan B. West
Nathan F. Fretten

INVENTOR
Thomas W. Small
BY Bates Fouts & Hull
ATTYS.

No. 896,474.
PATENTED AUG. 18, 1908.
T. W. SMALL.
STREET INDICATING DEVICE.
APPLICATION FILED FEB. 1, 1907.

4 SHEETS—SHEET 4.

WITNESSES:

INVENTOR,
Thomas W. Small.
BY
ATTYS.

UNITED STATES PATENT OFFICE.

THOMAS W. SMALL, OF CLEVELAND, OHIO, ASSIGNOR TO THE ACME AUTOMATIC STREET INDICATING COMPANY, OF CLEVELAND, OHIO, A CORPORATION OF OHIO.

STREET-INDICATING DEVICE.

No. 896,474.      Specification of Letters Patent.      Patented Aug. 18, 1908.

Application filed February 1, 1907. Serial No. 355,237.

*To all whom it may concern:*

Be it known that I, THOMAS W. SMALL, a citizen of the United States, residing at Cleveland, in the county of Cuyahoga and State of Ohio, have invented a certain new and useful Improvement in Street-Indicating Devices, of which the following is a full, clear, and exact description, reference being had to the accompanying drawings.

This invention relates to street or station indicators adapted to be carried by a railway car or other vehicle, and operated manually or automatically to disclose desired indications.

One of the objects of the invention is to provide such indicating device with an indicator facing in two directions so that with the device located in an intermediate portion of the car, the indication may be seen from either direction.

Another object is to arrange the indicator so that its indication may be seen from below it, enabling the indicator to be efficiently carried by the roof of the car.

Another object is to provide simple and efficient means for inclosing the indicator and allowing access to the interior.

Another object is to provide mechanism preventing inopportune or faulty operation of the indicator.

I attain the above results by mechanism illustrated herein and hereinafter more fully described.

The drawings show my indicator embodied in an approved form.

Figure 1:
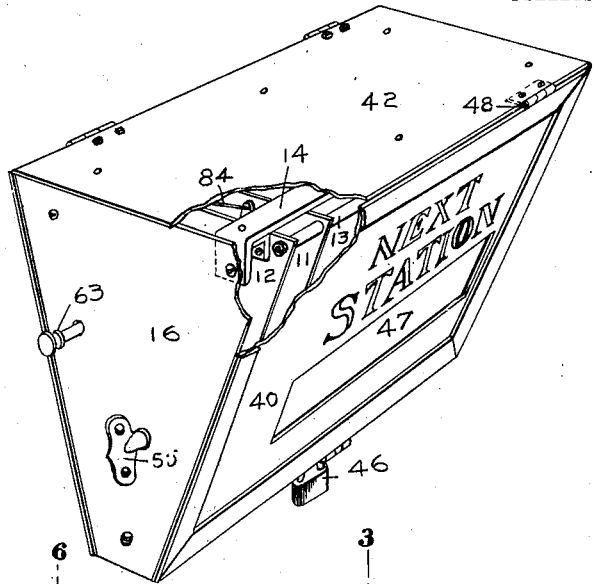
Figure 2:
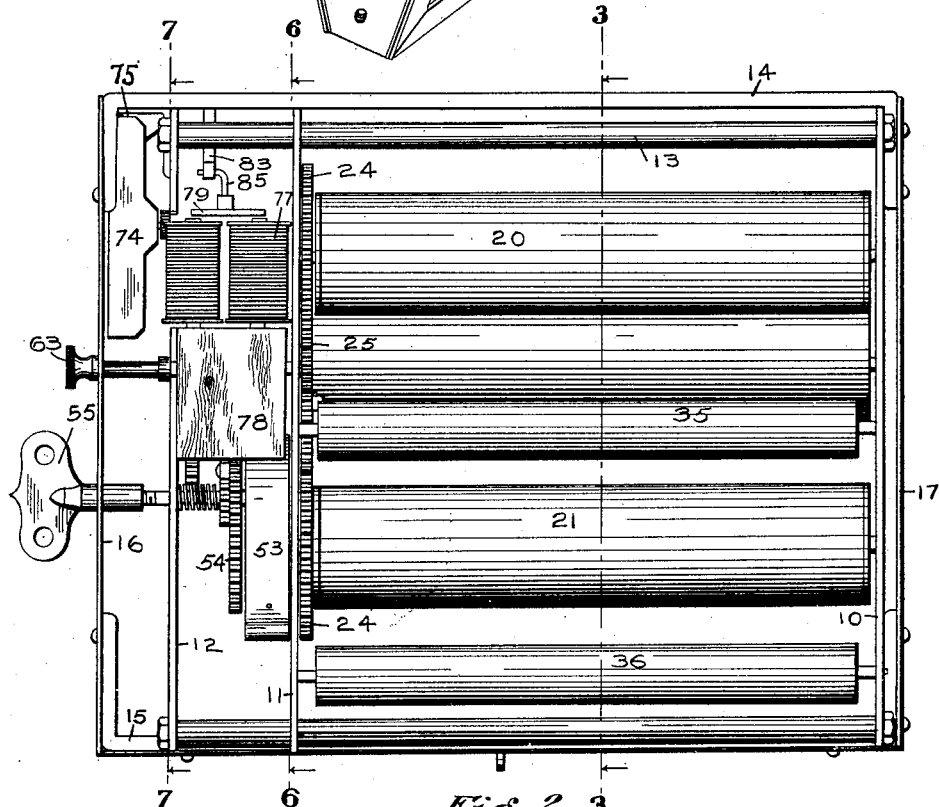
Figure 6:
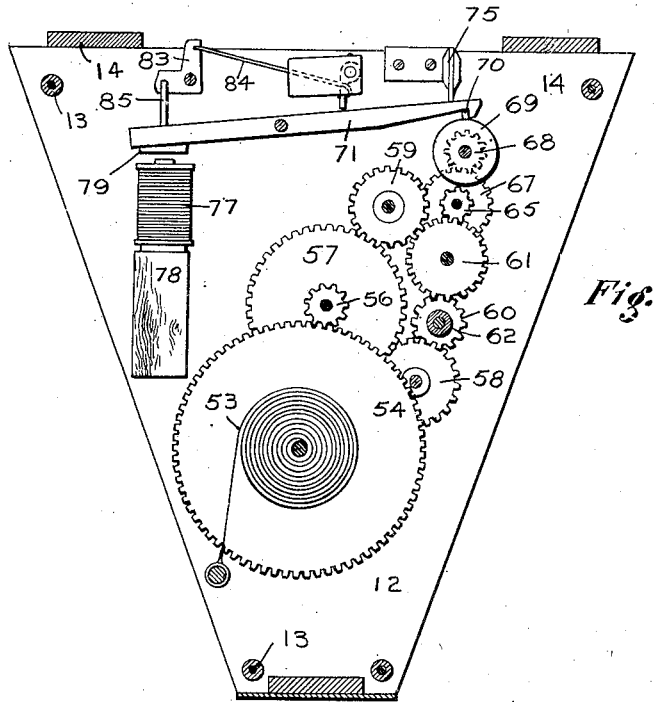
Figure 7:
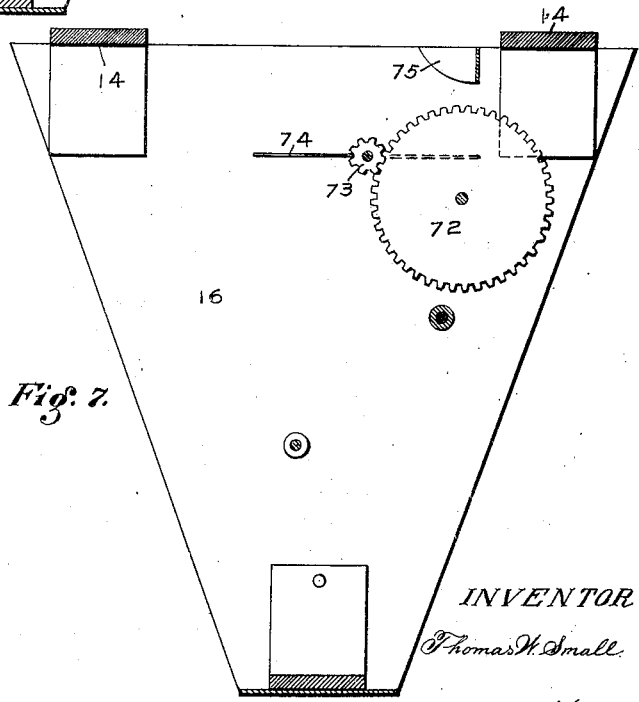
Figure 8:
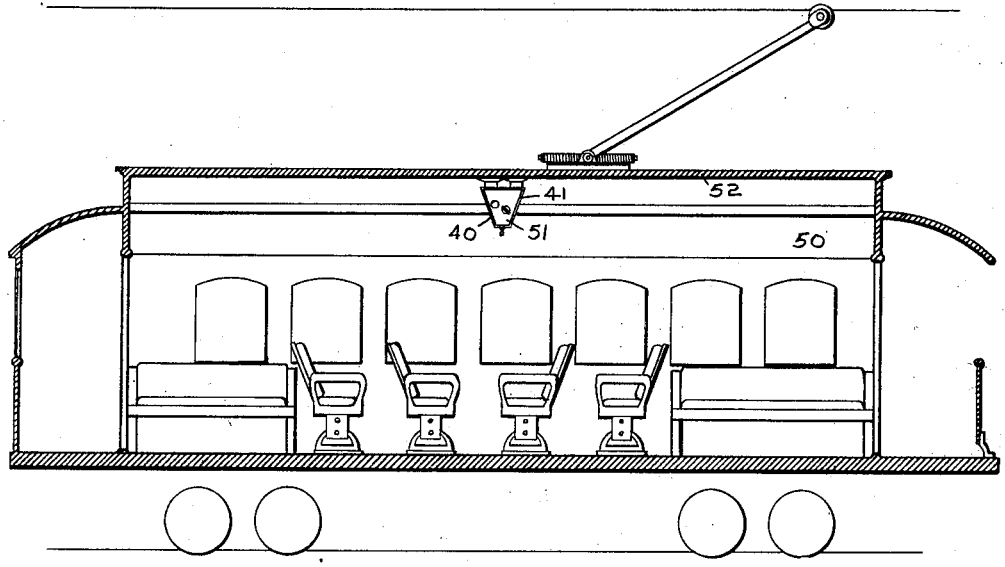
Figure 9:
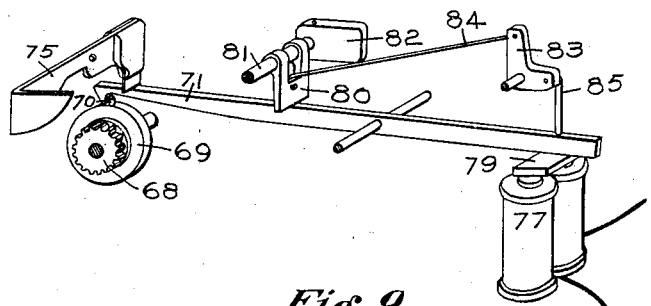

Figure 1 is a perspective view of the indicator in its case, a portion of the case at one corner being broken away to disclose the interior. Fig. 2 is a front elevation of the indicator with the front portion of the casing removed. Fig. 3 is a cross section through the indicator, one of the casing doors being opened, this section being taken on the line 3—3 of Fig. 2, looking toward the left. Fig. 4 is a side elevation of a portion of the train of gearing which controls the indicator. Fig. 5 is a longitudinal section through one of the spring barrels which carries the end of the indicating band or tape. Figs. 6 and 7 are vertical cross sections of the indicator substantially on the lines 6—6 and 7—7 respectively of Fig. 2, looking to the left. Fig. 8 is a longitudinal section of a car with my indicator in place. Fig. 9 is a perspective view of the magnetic operating mechanism and its safety appliances.

As shown in the drawing, vertical frame plates 10, 11 and 12 rigidly spaced by distance bolts 13 are carried by an outer frame consisting of the supporting bars 14 extending across the top, the supporting bar 15 extending across the bottom, said bars having their ends respectively turned downwardly and upwardly, and the end plates 16 and 17 connected with such ends.

Mounted in the frame members 10 and 11 are the spring barrels 20 and 21, each of which is adapted to carry one end of the band or tape which carries the indication. These spring barrels are mounted on rods 22 journaled in the frame members mentioned, each barrel being hollow, and a helical spring 23 occupying the bore and being connected at one end with the barrel and at the other end with the rod 22. The rods 22 are coupled together by means of gears 24 on the two rods respectively which mesh with an intermediate gear 25 loosely carried on the frame plate 11.

The tape or indicating band 30 is secured at one end to the spring barrel 20 and, as shown, passes off of its under side beneath the guide roller 31 around the upper and outer side of the driving roller 32, thence downwardly substantially parallel with one side of the indicator beneath the guide roller 33, thence upwardly around the outer and upper side of the other driving roller 34, thence across the upper side of the guide roller 35 and downwardly substantially parallel with the other side of the indicator beneath the guide roller 36 and thence upwardly onto the spring barrel 21. From this course of the band it will be apparent that two portions thereof may be exposed to view at opposite sides of the indicator, namely, on the one side, the portion between the driving roller 32 and the guide roller 33, and on the other side, the portion between the guide rollers 35 and 36. Suitable windows are provided through which such portions of the band are visible, the band being driven by the rotation of the driving rollers 32 and 34.

The windows 47 and 48 are carried by the two side members 40 and 41 of the casing, these side members being hinged at their upper edges to the top member 42 of the casing which is secured to the frame bars 14.

At their lower edges the casing sides are provided with hasps 43 which are adapted to extend over an ear 44 depending from the bottom member 45 of the casing. A suitable pin or lock 46 may be applied through this ear to hold the casing sides in position.

An inspection of Fig. 3 will show that the side of the ribbon which is visible through the window 47 is the outside face of the ribbon as it winds onto either spring barrel, while the side which shows through window 48 is the inside face of the ribbon as it winds onto the barrels. The corresponding indications on the ribbon are printed such distances apart that when one is showing through the window 47, the other will be visible through the window 48.

Fig. 8 is a conventional illustration of an electric car, wherein 50 may be taken as representing the car itself, and 51 my indicator complete carried by the roof of the car, substantially at mid position. It will be seen that the opposite faces 40 and 41 of the indicator may be seen not only from the respective ends of the car but that one face or the other may be seen from any intermediate point; in fact, one face or the other is visible to a passenger standing directly beneath the indicator, this being due to the fact that the opposite faces incline inwardly toward the bottom, as shown.

The ends of the ribbon are mounted on the spring barrels, as shown, so that the end may be always taken up and the ribbon kept taut, and at the same time, the ribbon may be allowed to play out as desired,—the barrels being geared together and whenever the ribbon is pulled off of one barrel, the other barrel being correspondingly rotated to take up the other end of the ribbon. Inasmuch, however, as one barrel is decreasing in size as the other is increasing, the intermediate springs are provided to enable differential rotation. This feature is covered in my Patent No. 738,366 granted September 8, 1903.

To drive the ribbon, I provide suitable clock work which rotates the driving roller 34, this roller being geared with the roller 32 which in turn is geared with the roller 31. I will now describe this clock work. The shaft 64 of the roller 34 extends through the frame plates 11 and 12 and carries a sleeve 62 which is splined to the shaft so that it rotates therewith. Mounted between the frame members 11 and 12 is the driving spring 53, one end of which is anchored and the other end secured to a pin connected by a ratchet with the main gear 54. This pin may be rotated by a suitable key as 55 to wind up the spring. The main gear 54 meshes with a pinion 56 rigid with a gear 57 which meshes with pinions 58 and 59, the latter pinion meshing with a pinion 61. Now either pinion 58 or 61 is adapted to mesh with the pinion 60 on the sleeve 62 according as that sleeve is shifted inwardly or outwardly, whereby the force of the spring may drive the shaft 64 in one direction or the other, as desired, it being only necessary to shove inwardly or outwardly the head 62 of the sleeve. The gear 61 of the train is shown as meshing with a pinion 65 on the shaft 66 on which is a gear 67 which meshes with a pinion 68 rigid with a head 69 which carries a projection 70. A lever 71 normally engages this projection and prevents the train of gears from rotating. The shaft 66 carries on its end a gear 72 which meshes with a pinion 73 on which is a flier 74. Pivotally carried by the frame 12 is a lever 75 which is connected at one end with the lever 71 and has its other end in position to just normally clear the flier 74.

From the above described construction, it follows that when the forward end of lever 71 is pulled downward the train of gearing is released at 70, but the lever 75 is brought into the path of the flier so that only a slight movement of the gearing takes place. Then when the lever 71 is returned to normal position, the rotation continues until the head 69 has made a complete rotation, the pin 70 again coming into engagement with the lever. Therefore, to cause an effective release of the gearing to effect an advancement of the ribbon, it is necessary to not only pull down the forward end of the lever 71 but also to release such lever. It is therefore impossible for the mechanism to run continuously by reason of the lever being inadvertently held down. The ribbon is fed forward for each actuation of the lever only the proper distance to indicate the next station, and any subsequent advance of the ribbon requires subsequent actuation of the lever. This is of particular importance where the lever 71 is operated magnetically by the automatic closure of a circuit due to the car arriving at certain points, for if the car should stop at these points the magnet might hold down the lever for a considerable time. With my mechanism no actuation would be given the band until the car had resumed its travel and cleared that circuit closure.

The lever 71 may be actuated by any suitable means. For this purpose I have shown an electro-magnet 77 mounted on a block 78 carried by the frame member 12 and having an armature 79 connected with the lever 71. An energization and subsequent release of this magnet, manually or automatically, may therefore release the clock work to advance the ribbon one step.

To prevent the lever 71 inadvertently jarring away from the projection 70 in the running of the car, I provide the gate 80 which is secured to a rock shaft 81 loosely journaled above the lever 71 and provided with a counterweight 82. This arrangement of parts is best shown in Fig. 9, it having been omitted from Fig. 2 so as not to encumber that figure with too many lines and thus obscure more important parts. This counterweight normally holds the gate with its lower edge just a slight distance above the lever, preventing it from materially rising. Above the magnet is a bell cran 83k, one arm of which is connected by a link 84 with the gate 80 and the other arm by a link 85 with the lever 71 near its forward end. There is a small amount of play between the gate and the lever 71, and as the magnet pulls the armature downward, the first portion of the movement, while such looseness is being taken up, operates to swing the gate 80 away from the lever so that the rear end of the lever may rise, the gate swinging upward faster than the lever below it rises. The play between the gate and the lever is so small that the lever cannot normally rise high enough to release the projection.

I claim:

1. In a machine of the character described, an indicating device, means for driving the same, a projection provided upon one of the moving parts of said driving mechanism, a lever having a shoulder normally in the path of said projection, a mechanism to normally prevent the removal of said shoulder, a stopping device connected with said lever, and means for operating said lever.

2. In a machine of the character described, an indicating device, means for driving the same, a projection provided upon one of the rotating parts of said driving mechanism, an oscillating lever having a shoulder normally in the path of said projection, a second lever connected therewith and adapted to engage a part of the rotating mechanism when the shoulder clears the projection, means adapted to hold said shoulder in the path of said projection, and an electro-magnet for operating said lever.

3. In an indicator, the combination of indicating mechanism, a train of gearing for driving the same, a lever adapted to restrain the gearing, a gate adapted to prevent accidental movement of the lever, and means for moving said gate to release the lever and for moving said lever.

4. In an indicator, the combination of indicating mechanism, a clock work for driving the same having a rotating member with a shoulder, a pivoted lever adapted to engage said shoulder, a magnet adapted to operate said lever, a pivoted gate adapted to bear on said lever and prevent its inopportune movement, and mechanism adapted to be operated by said magnet to release said gate, allowing the magnet to also operate the lever to release the clock work.

5. In an indicator, the combination of indicating mechanism, a clock work for driving the same having a rotating member with a shoulder, a pivoted lever adapted to engage said shoulder, an armature for said lever, a magnet adapted to operate said armature, a member adapted to bear on said lever and prevent its inopportune movement, a bell crank, links connecting the bell crank with said member and said armature, and mechanism adapted to stop the clock work when said magnet releases said rotating member and release the clockwork when the magnet is deënergized.

6. In an indicating mechanism, an indicating band, a driving roller therefor, gearing for operating said roller, a flier operated by said gearing, there being a projection upon one of said gears, a lever normally engaging said projection, a second lever arranged in the path of movement of the first lever and adapted to be rocked by the first lever, whereby, when the first lever is actuated to release the projection on the gear the second lever will be rocked to engage the flier, and means for operating the first lever.

In testimony whereof, I hereunto affix my signature in the presence of two witnesses.

THOMAS W. SMALL.

Witnesses:
ALBERT H. BATES,
J. B. HULL.